United States Patent
Chen et al.

(10) Patent No.: US 11,641,576 B2
(45) Date of Patent: May 2, 2023

(54) METHOD AND APPARATUS FOR IDENTIFYING DUAL-MODE WIRELESS DEVICE, IOS DEVICE, AND MEDIUM

(71) Applicant: YEALINK (XIAMEN) NETWORK TECHNOLOGY CO., LTD., Fujian (CN)

(72) Inventors: Jinhong Chen, Fujian (CN); Rongshan Liu, Fujian (CN)

(73) Assignee: YEALINK (XIAMEN) NETWORK TECHNOLOGY CO., LTD., Xiamen (CN)

(*) Notice: Subject to any disclaimer, the term of this patent is extended or adjusted under 35 U.S.C. 154(b) by 0 days.

(21) Appl. No.: 17/467,175

(22) Filed: Sep. 3, 2021

(65) Prior Publication Data
US 2022/0103998 A1    Mar. 31, 2022

(30) Foreign Application Priority Data
Sep. 30, 2020    (CN) .......................... 202011068802.8

(51) Int. Cl.
| | |
|---|---|
| *H04B 7/00* | (2006.01) |
| *H04W 8/00* | (2009.01) |
| *H04W 76/14* | (2018.01) |
| *H04W 4/80* | (2018.01) |
| *H04W 88/06* | (2009.01) |

(52) U.S. Cl.
CPC .............. *H04W 8/005* (2013.01); *H04W 4/80* (2018.02); *H04W 76/14* (2018.02); *H04W 88/06* (2013.01)

(58) Field of Classification Search
CPC ....... H04W 8/005; H04W 76/14; H04W 4/80; H04W 88/06
USPC .......................................................... 455/41.1
See application file for complete search history.

(56) References Cited

U.S. PATENT DOCUMENTS

| | | | | |
|---|---|---|---|---|
| 11,330,431 | B2* | 5/2022 | Golsch | H04W 4/80 |
| 2014/0169599 | A1* | 6/2014 | Solum | H04R 25/554 |
| | | | | 381/315 |
| 2015/0341450 | A1* | 11/2015 | Reunamaki | H04L 67/52 |
| | | | | 705/14.58 |
| 2016/0100311 | A1* | 4/2016 | Kumar | H04W 12/06 |
| | | | | 726/7 |
| 2016/0227351 | A1* | 8/2016 | Gu | H04B 17/318 |
| 2017/0230535 | A1* | 8/2017 | Yasuzaki | H04N 1/32793 |
| 2017/0272270 | A1* | 9/2017 | Gu | H04B 17/318 |
| 2018/0249310 | A1* | 8/2018 | Kim | H04W 8/005 |

(Continued)

*Primary Examiner* — April G Gonzales (57) ABSTRACT

Method and apparatus for identifying a dual-mode wireless device, IOS device, and medium. The method includes: receiving a Bluetooth Low Energy (BLE) advertising packet from a slave device; extracting a Media Access Control (MAC) address carried in the BLE advertising packet from the slave device and that is of a master device that has established a classic Bluetooth connection with the slave device; and if the MAC address is a MAC address of a current master device, establishing a BLE connection with the slave device; or if the MAC address is not a MAC address of a current master device, ignoring the BLE advertising packet from the slave device. The method has advantages of a high identification speed and high identification accuracy. The method does not require an additional application for Apple's MFi certification, which saves certification costs, shortens the time on product development, and simplifies the production process.

13 Claims, 5 Drawing Sheets

(56) References Cited

U.S. PATENT DOCUMENTS

| | | | | |
|---|---|---|---|---|
| 2018/0330293 A1* | 11/2018 | Kulkarni | ............ | G06K 7/10366 |
| 2018/0332434 A1* | 11/2018 | Kulkarni | ................. | H04L 43/10 |
| 2019/0158975 A1* | 5/2019 | Petersen | ................. | H04L 69/18 |
| 2019/0305567 A1* | 10/2019 | Keeley | ................... | H02J 50/80 |
| 2020/0162435 A1* | 5/2020 | Kubo | ..................... | A61B 5/112 |

* cited by examiner

METHOD AND APPARATUS FOR IDENTIFYING DUAL-MODE WIRELESS DEVICE, IOS DEVICE, AND MEDIUM

CROSS-REFERENCE TO RELATED APPLICATIONS

The present application claims the benefit of Chinese Patent Application No. 202011068802.8 filed on Sep. 30, 2020, the contents of which are hereby incorporated by reference.

TECHNICAL FIELD

The present disclosure relates to the field of wireless communications technologies, and in particular, to a method and apparatus for identifying a dual-mode wireless device, a smart terminal IOS device, and a computer-readable medium.

BACKGROUND

A Bluetooth technology is a universal short-range wireless communications technology. The Bluetooth technology provides a short-range data communication means, and has advantages such as low costs, low power consumption, and a relatively high transmission rate. A device that supports only a Bluetooth Low Energy (BLE) connection is referred to as a single-mode wireless device, and a device that supports both a BLE connection and a classic Bluetooth connection is referred to a dual-mode wireless device. A BLE mode is applicable to short-term and small-data transmission, while a classic Bluetooth mode is applicable to long-term and large-data transmission. Generally, the BLE mode is more power-efficient than the classic Bluetooth mode.

At present, when an IOS system-based device is connected to a dual-mode wireless device (referred to as a slave device for short below), the IOS device usually needs to establish a BLE connection with the slave device that has established a classic Bluetooth connection, to conduct configuration on the slave device. However, due to limitations of the IOS system, during use of an App on a master device that supports a BLE connection, a list of devices that have established classic Bluetooth connections with the master device currently cannot be obtained. Therefore, when the IOS device needs to use the BLE mode to connect to multiple nearby slave devices that have established classic Bluetooth connections, the IOS device cannot position the slave devices accurately. As a result, the IOS device conducts configuration on an incorrect slave device, or it takes a long time for the IOS device to find a slave device on which the IOS device wants to conduct configuration. At present, the common solution is to apply for Apple's MFi certification. However, the application takes a long time and requires a high cost, and also requires to develop certification-related functions. In addition, after the MFi certification is granted, it is also required to introduce key management and burning in the production process, which means a complicated production process.

SUMMARY

An objective of the present disclosure is to provide a method and apparatus for identifying a dual-mode wireless device, an IOS device, and a medium. According to the method, Media Access Control (MAC) address information of a master device that has established a classic Bluetooth connection with a slave device is added to an advertising packet from the slave device. When a BLE connection to the slave device needs to be established, whether the slave device and a current master device have established a classic Bluetooth connection can be identified by determining only whether an extracted MAC address that is carried by the slave device and that is of the master device that has established the classic Bluetooth connection with the slave device is the same as a MAC address of the current master device. The method avoids a problem that configuration is conducted on an incorrect slave device or it takes a long time to find a slave device on which configuration is expected to be conducted, and has a high identification speed and high identification accuracy. The method does not require an additional application for Apple's MFi certification, which saves certification costs, shortens the time on product development, and simplifies the production process.

To overcome the foregoing defects in the prior art, an embodiment of the present disclosure provides a method for identifying a dual-mode wireless device, including:

receiving a BLE advertising packet from a slave device;

extracting a MAC address that is carried in the BLE advertising packet from the slave device and that is of a master device that has established a classic Bluetooth connection with the slave device; and if the MAC address is a MAC address of a current master device, establishing a BLE connection with the slave device; or if the MAC address is not a MAC address of a current master device, ignoring the BLE advertising packet from the slave device.

Further, after the receiving a BLE advertising packet from a slave device, the method further includes:

when the slave device has established a classic Bluetooth connection, establishing a BLE connection with the slave device;

extracting the MAC address that is carried in the BLE advertising packet from the slave device and that is of the master device that has established the classic Bluetooth connection with the slave device, and determining whether the extracted MAC address is the same as a MAC address of the current master device that has established the BLE connection with the slave device; and if the extracted MAC address is the same as the MAC address of the current master device that has established the BLE connection with the slave device, storing the MAC address as the MAC address of the current master device; or if the extracted MAC address is different from the MAC address of the current master device that has established the BLE connection with the slave device, removing the BLE connection from the slave device.

Further, before the receiving a BLE advertising packet from a slave device, the method further includes:

if a time for searching for the BLE advertising packet from the slave device is greater than a preset time threshold, terminating the search operation.

An embodiment of the present disclosure further provides a method for identifying a dual-mode wireless device, including:

sending a BLE advertising packet to a master device, and allowing the master device to extract a MAC address that is carried in the BLE advertising packet and that is of a master device that has established a classic Bluetooth connection with a current slave device; and if the MAC address is a MAC address of the master device, establishing a BLE connection with the master device; or if the MAC address is not a MAC address of the master device, continuing to send the BLE advertising packet to a nearby master device.

Further, after the sending a BLE advertising packet to a master device, the method further includes:

when a classic Bluetooth connection to the master device has been established, establishing a BLE connection with the master device;

allowing the master device to extract the MAC address that is carried in the BLE advertising packet and that is of the master device that has established the classic Bluetooth connection with the current slave device; and if the MAC address is the same as the MAC address of the master device that has established the BLE connection with the current slave device, allowing the master device to store the MAC address as the MAC address of the master device; or if the MAC address is different from the MAC address of the master device that has established the BLE connection with the current slave device, making a response to a BLE connection removal request sent by the master device.

Further, before the sending a BLE advertising packet to a master device, the method further includes:

adding, to the BLE advertising packet, MAC address information of the master device that has established the classic Bluetooth connection with the current slave device.

An embodiment of the present disclosure further provides an apparatus (100) for identifying a dual-mode wireless device, including a master device and a slave device, where the master device (01) is configured to: receive a BLE advertising packet from the slave device; extract a MAC address that is carried in the BLE advertising packet from the slave device and that is of a master device that has established a classic Bluetooth connection with the slave device; and if the MAC address is a MAC address of a current master device, establish a BLE connection with the slave device; or if the MAC address is not a MAC address of a current master device, ignore the BLE advertising packet from the slave device; and the slave device (02) is configured to: send the BLE advertising packet to the master device, and allow the master device to extract the MAC address that is carried in the BLE advertising packet and that is of the master device that has established the classic Bluetooth connection with a current slave device; and if the MAC address is the MAC address of the master device, establish a BLE connection with the master device; or if the MAC address is not the MAC address of the master device, continue to send the BLE advertising packet to a nearby master device.

An embodiment of the present disclosure further provides a smart terminal IOS device, including:

one or more processors; and a memory, coupled to the processor, and configured to store one or more programs; where when the one or more programs are executed by the one or more processors, the one or more processors are enabled to implement the method for identifying a dual-mode wireless device that is described in any one of the implementations.

An embodiment of the present disclosure further provides a computer-readable storage medium, where the computer-readable storage medium stores a computer program; and when the computer program is executed by a processor, the method for identifying a dual-mode wireless device that is described in any one of the implementations is implemented.

Compared with the prior art, the present disclosure has at least the following beneficial effects:

According to the method for identifying a dual-mode wireless device provided in the present disclosure, MAC address information of the master device that has established the classic Bluetooth connection with the slave device is added to the advertising packet from the slave device. When a BLE connection to the slave device needs to be established, whether the slave device and the current master device have established a classic Bluetooth connection can be identified by determining only whether the extracted MAC address that is carried by the slave device and that is of the master device that has established the classic Bluetooth connection with the slave device is the same as the MAC address of the current master device. The method avoids a problem that configuration is conducted on an incorrect slave device or it takes a long time to find a slave device on which configuration is expected to be conducted, and has a high identification speed and high identification accuracy. The method does not require an additional application for Apple's MFi certification, which saves certification costs, shortens the time on product development, and simplifies the production process.

DETAILED DESCRIPTION

The following clearly and completely describes the technical solutions in the embodiments of the present disclosure with reference to accompanying drawings in the embodiments of the present disclosure. Apparently, the described embodiments are merely a part rather than all of the examples of the present disclosure. All other embodiments obtained by persons of ordinary skill in the art based on the embodiments in the present disclosure without creative efforts shall fall within the protection scope of the present disclosure.

It should be understood that a smart terminal IOS device mentioned in the specification includes but is not limited to a smartphone, a tablet computer, a smart band, a smart watch, a smart television, and other IOS system-based terminal devices. A dual-mode wireless device includes but is not limited to a smart remote control, a Bluetooth earphone, a Bluetooth speaker, and other devices.

It should be understood that step numbers used in the specification are only for ease of description, but are not intended to limit a step execution order.

It should be understood that the terms used in this specification of the present disclosure are merely intended to describe specific embodiments, but are not intended to limit the present disclosure. As used in this specification of the present disclosure and the appended claims, the singular forms "a", "an" and "the" are intended to include the plural forms unless the context clearly indicates otherwise.

The terms "include" and "comprise" indicate the existence of the described feature, entity, step, operation, element and/or component, but do not exclude the existence or addition of one or more other features, entities, steps, operations, elements, components and/or a combination thereof.

The term "and/or" refers to one of or any combination or all possible combinations of more of items listed in association, and includes these combinations.

Figure 1:
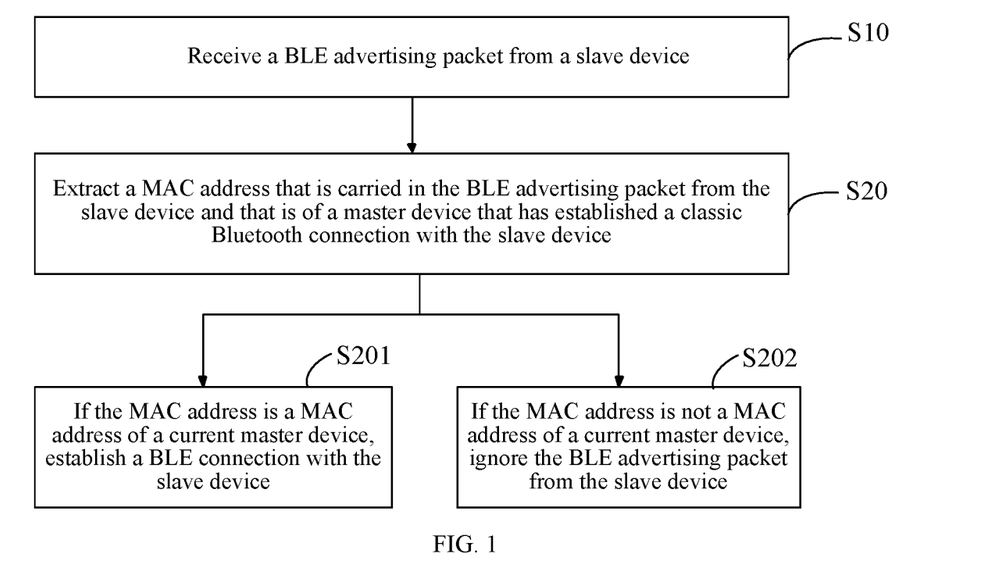
FIG. 1 is a schematic flowchart of a method for identifying a dual-mode wireless device according to an embodiment of the present disclosure.

First Aspect:

Referring to FIG. 1, an embodiment of the present disclosure provides a method for identifying a dual-mode wireless device, including the following steps:

S10. Receive a BLE advertising packet from a slave device.

S20. Extract a MAC address that is carried in the BLE advertising packet from the slave device and that is of a master device that has established a classic Bluetooth connection with the slave device.

S201. If the MAC address is a MAC address of a current master device, establish a BLE connection with the slave device.

S202. If the MAC address is not a MAC address of a current master device, ignore the BLE advertising packet from the slave device.

In this embodiment of the present disclosure, it should be noted that the slave device is a dual-mode wireless device, and the dual-mode wireless device supports the conventional/classic Bluetooth (BT) protocol and the Bluetooth Low Energy (BLE) protocol. A classic Bluetooth connection is mainly used to transmit sound, such as a Bluetooth connection implemented by a Bluetooth earphone or a Bluetooth speaker. For short-distance audio transmission, classic Bluetooth transmission is preferably selected. Currently, there are also WiFi-based audio transmission schemes such as Airplay, but power consumption of WiFi-based audio transmission is much higher than that of Bluetooth-based audio transmission, and a device based on WiFi-based audio transmission is not a portable. Therefore, audio transmission devices such as mobile earphones and portable speakers are all based on the classic Bluetooth protocol. In addition, the classic Bluetooth connection is also used to transmit a large amount of data. For example, in some industrial control scenarios, Android or Linux is used for master control, and a Bluetooth remote control device is externally installed. The Bluetooth remote control device may use the SPP protocol in classic Bluetooth, is used as a wireless serial port, and has a transmission speed much higher than that of BLE transmission. The Bluetooth Low Energy is mainly used to wireless communication with low power consumption and a small amount of data, for example, wireless communication based on a remote control (mouse or keyboard) and a sensing device (a heartbeat belt, a sphygmomanometer, a temperature sensor, a shared bicycle lock, a smart lock, an anti-lost device, and an indoor positioning device). The dual-mode wireless device supports both protocols. For example, a smart television remote control has a voice recognition function and can transmit sound by only using classic Bluetooth. However, if a complex key such as a function key that does not exist in an original keyboard table needs to be provided, the HID key protocol in classic Bluetooth is not available, and the BLE protocol should be used as a private protocol. For another example, a noise-canceling headphone often needs to adjust a noise canceling effect through an App by the BLE protocol as a private communication protocol.

In this embodiment of the present disclosure, further, a case in which an App that is on a smart terminal IOS device and that is used for establishing a BLE connection is used as a first execution body is used to describe the solution. The App on the smart terminal IOS device first receives a BLE advertising packet from a nearby slave device, where the slave device has recorded a MAC address of a master device that has established a classic Bluetooth connection with the slave device. Then, the App compares the MAC address with a MAC address of the current master device. If the MAC address is the same as the MAC address of the current master device, it indicates that the master device is the master device that has established the classic Bluetooth connection with the slave device. In this case, the App only needs to establish a BLE connection with the slave device. If the MAC address is different from the MAC address of the current master device, the App ignores the advertising packet from the slave device, and continues to search for an advertising packet from a next slave device.

According to the method for identifying a dual-mode wireless device provided in the present disclosure, MAC address information of the master device that has established the classic Bluetooth connection with the slave device is added to the advertising packet from the slave device. When a BLE connection to the slave device needs to be established, whether the slave device and the current master device have established a classic Bluetooth connection can be identified by determining only whether the extracted MAC address that is carried by the slave device and that is of the master device that has established the classic Bluetooth connection with the slave device is the same as the MAC address of the current master device. The method avoids a problem that configuration is conducted on an incorrect slave device or it takes a long time to find a slave device on which configuration is expected to be conducted, and has a high identification speed and high identification accuracy. The method does not require an additional application for Apple's MFi certification, which saves certification costs, shortens the time on product development, and simplifies the production process.

Figure 2:
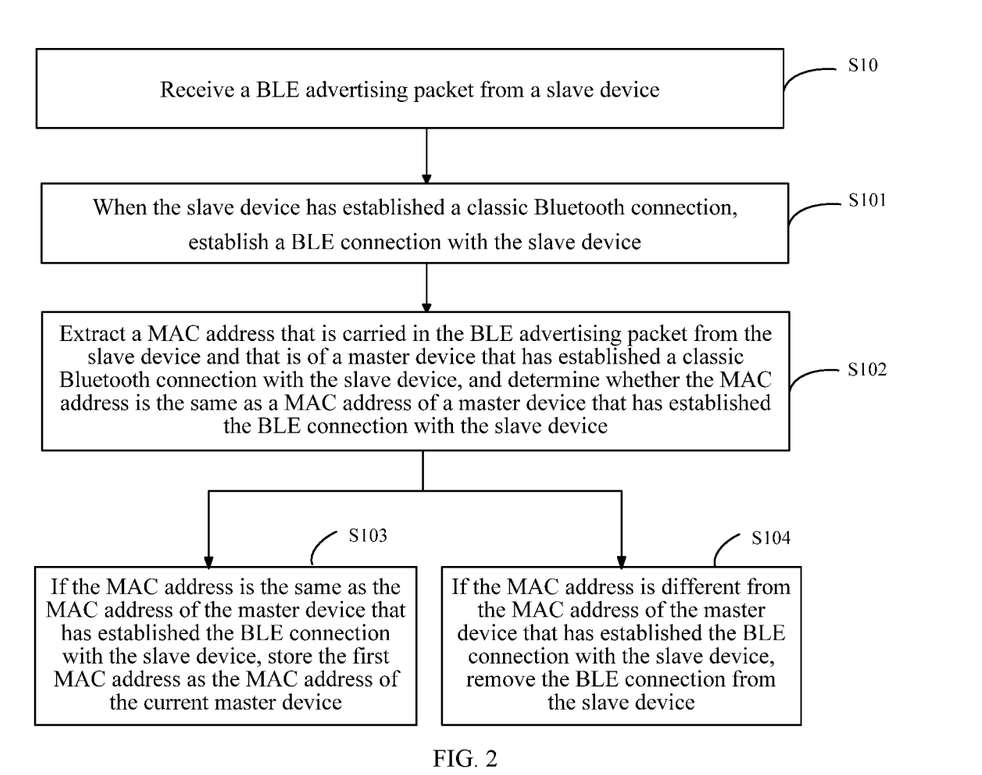
FIG. 2 is a schematic flowchart of a method for obtaining a MAC address of a master device according to an embodiment of the present disclosure.

Second Aspect:

Referring to FIG. 2, an embodiment of the present disclosure further provides a schematic flowchart of obtaining a MAC address of a current device by an App on the current device, including the following steps.

S10. Receive a BLE advertising packet from a slave device.

S101. When the slave device has established a classic Bluetooth connection, establish a BLE connection with the slave device.

S102. Extract a MAC address that is carried in the BLE advertising packet from the slave device and that is of a master device that has established a classic Bluetooth connection with the slave device, and determine whether the extracted MAC address is the same as a MAC address of the current master device that has established the BLE connection with the slave device.

S103. If the extracted MAC address is the same as the MAC address of the current master device that has established the BLE connection with the slave device, store the MAC address as the MAC address of the current master device.

S104. If the extracted MAC address is different from the MAC address of the current master device that has established the BLE connection with the slave device, remove the BLE connection from the slave device.

It can be understood that the slave device adds, to the advertising packet sent by the slave device, MAC address information of the master device that has established the classic Bluetooth connection with the slave device. If the slave device has not established a classic Bluetooth connection with a master device before, the MAC address information is null. Then, an App on the master device searches for a nearby device when being started for the first time. Because the App cannot obtain the MAC address of the master device, the App successively establishes BLE connections with nearby slave devices that have relatively strong signals and that have established classic Bluetooth connections. In these slave devices, some slave devices have established classic Bluetooth connections with the current master device, and some slave devices have established classic Bluetooth connections with other master devices. Therefore, identification needs to be conducted. An identification method mainly includes: After the App on the master device is connected to a slave device, the App extracts, from the slave device, a MAC address of the master device that has established a BLE connection with the slave device currently and a MAC address of a master device that has established a classic Bluetooth connection with the slave device currently. If the two addresses are the same, the App on the master device can confirm that the MAC address is a Bluetooth MAC address of the master device, and record the MAC address in the App. In addition, the record is always valid provided that the App is not deleted. During next search (There is a search time threshold. For example, after a search time exceeds five seconds, if an advertising packet from a slave device has not been received, the search is terminated. The threshold may be set by the App depending on an actual requirement. This is not limited herein), the App only needs to determine, through comparison, whether a MAC address that is carried in an advertising packet from a slave device and that is of a master device that has established a classic Bluetooth connection with the slave device is the same as the MAC address recorded in the App, to determine whether the master device has established a classic Bluetooth connection with the slave device, that is, complete rapid positioning of a dual-mode wireless device that has established a classic Bluetooth connection, provided that the MAC address of the current master device is obtained.

Figure 3:
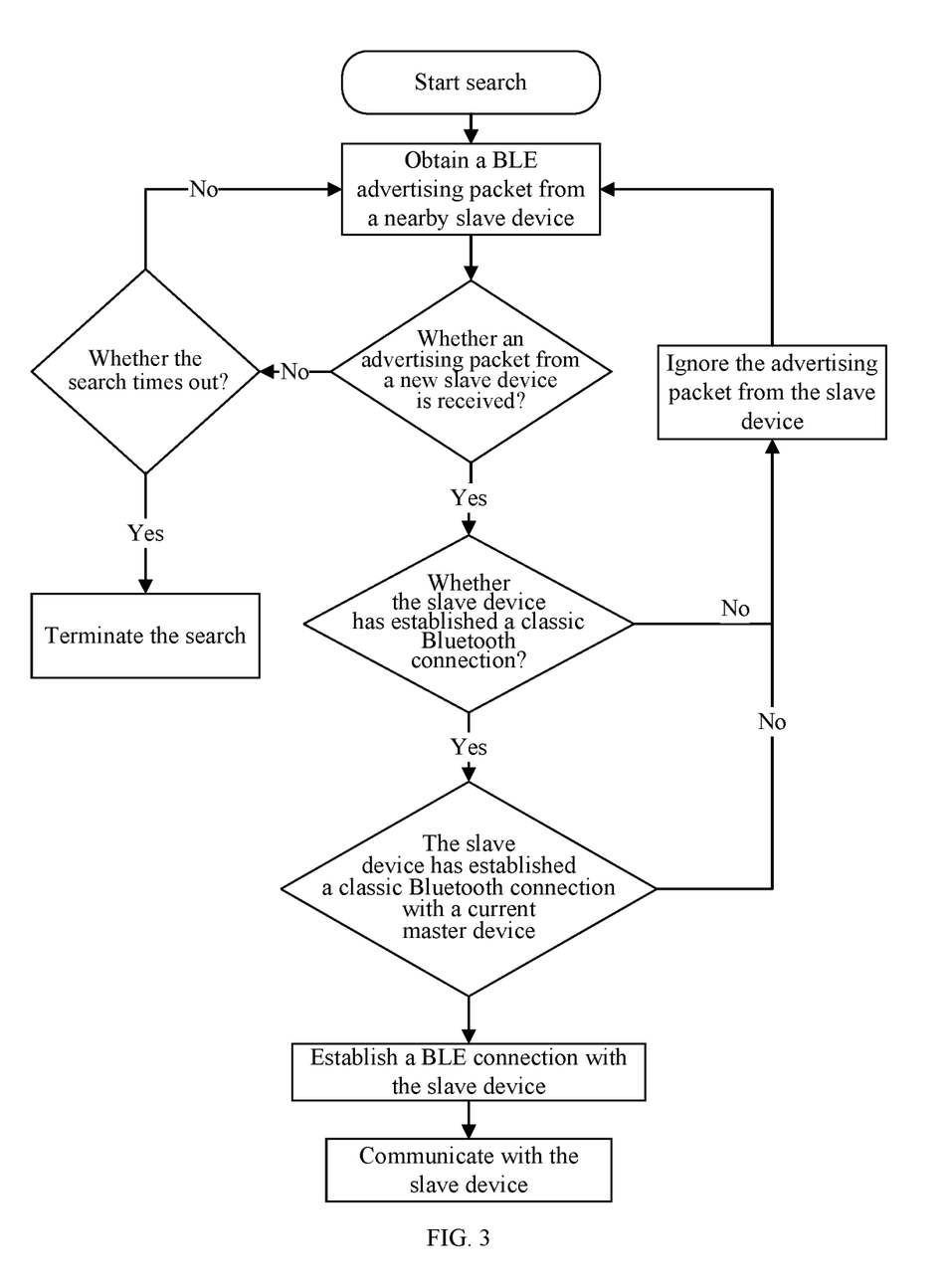
FIG. 3 is a block flow diagram of steps of a method for identifying a dual-mode wireless device according to an embodiment of the present disclosure.

Third Aspect:

Referring to FIG. 3, an embodiment of the present disclosure provides a block flow diagram of a method for identifying a dual-mode wireless device. The method is also based on a case in which a smart terminal IOS device (a master device) is used as a first execution body, and is implemented based on a case in which an App on the master device has successfully stored a MAC address of the current device. As shown in the figure, the App on the master device is first enabled to search for nearby slave devices that can be connected, obtains BLE advertising packets from the nearby slave devices, and is successively connected to the slave devices in descending order of signal strength. A search time threshold is set in advance, for example, five seconds. If a search time exceeds this value, and the App has not received an advertising packet from a new slave device, the search is terminated, or a location of the master device may be moved to conduct search again. When receiving an advertising packet from a new slave device, the App first determines whether the slave device has established a classic Bluetooth connection. A determining method is as follow: A MAC address that is recorded in the slave device and that is of a master device that has established a classic Bluetooth connection with the slave device is extracted. If the address is null, it indicates that the slave device has not established a classic Bluetooth connection, and the advertising packet from the slave device can be directly ignored. If the MAC address of the master device recorded in the slave device is extracted, only comparison between the extracted MAC address and the MAC address of the current master device needs to be conducted. When the two addresses are the same, it indicates that the slave device has established a classic Bluetooth connection with the current master device. Then, the current master device may establish a BLE connection with the slave device, and conduct configuration of related performance on the slave device by the App.

Figure 4:
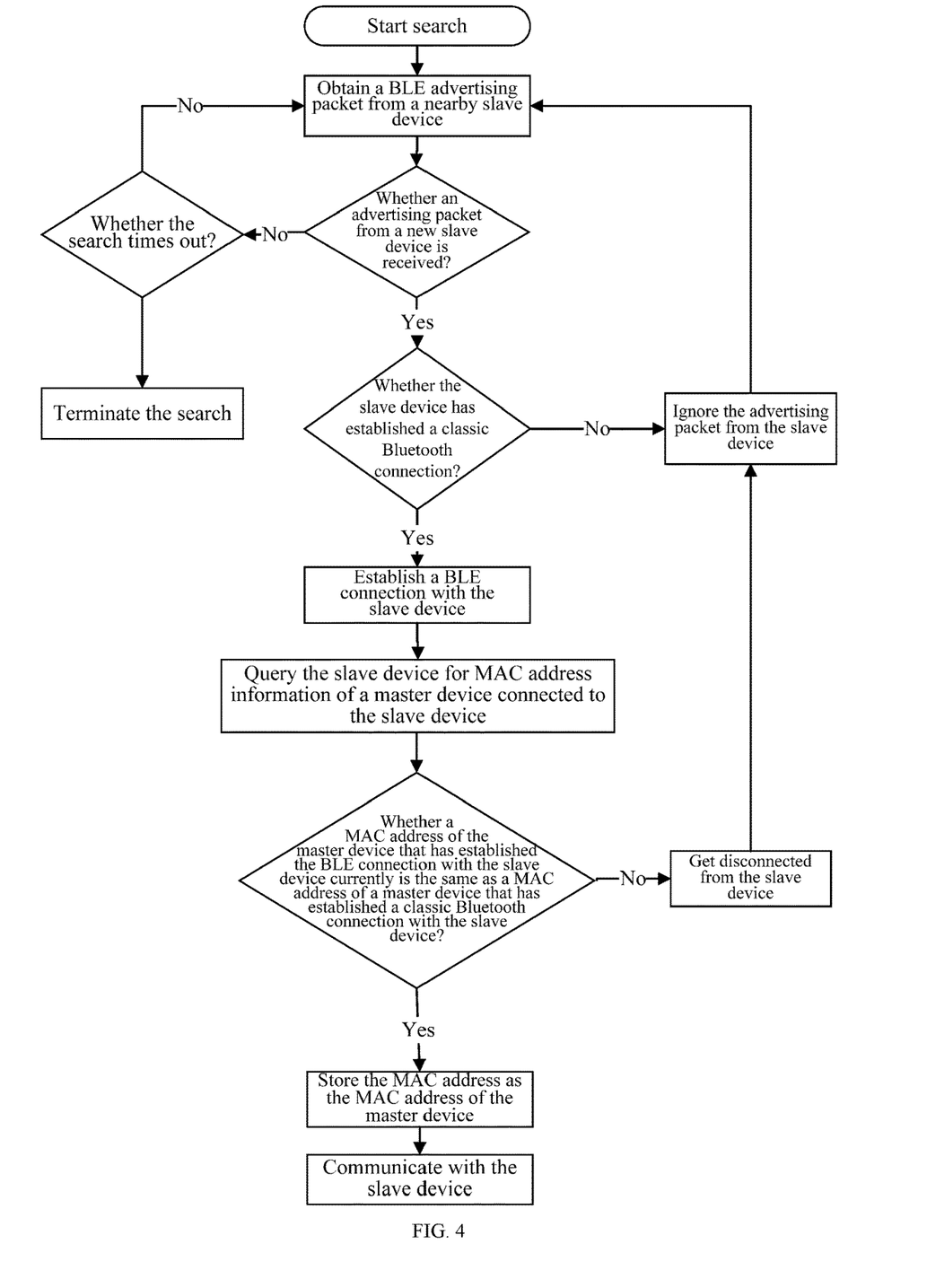
FIG. 4 is a block flow diagram of steps of a method for obtaining a MAC address of a master device according to an embodiment of the present disclosure.

Referring to FIG. 4, it should be noted that this figure shows steps of obtaining a MAC address of a master device according to an embodiment of the present disclosure. A first execution body is still a smart terminal IOS device (master device). An App on the master device is first enabled to search for nearby slave devices that can be connected, obtains BLE advertising packets from the nearby slave devices, and is successively connected to the slave devices in descending order of signal strength. A search time threshold is set in advance, for example, five seconds. If a search time exceeds this value, and the App has not received an advertising packet from a new slave device, the search is terminated, or a location of the master device may be moved to conduct search again. When receiving an advertising packet from a new slave device, the App first determines whether the slave device has established a classic Bluetooth connection. If the slave device has not established a classic Bluetooth connection, the advertising packet from the slave device is ignored. If the slave device has established a classic Bluetooth connection, the master device establishes a BLE connection with the slave device. In this case, the master device extracts, from the slave device, a MAC address of a master device connected to the slave device. If a MAC address that is carried by the current slave device and that is of a master device that has established a classic Bluetooth connection with the slave device is the same as the MAC address of the master device that has established the BLE connection with the current slave device, the master device determines that the MAC address is the MAC address of the current master device, and stores the MAC address in the App on the current master device. If a MAC address that is carried by the current slave device and that is of a master device that has established a classic Bluetooth connection with the slave device is different from the MAC address of the master device that has established the BLE connection with the current slave device, the current master device gets disconnected from the slave device, and returns to the step of obtaining BLE advertising packets from the nearby slave devices and conducts the subsequent operations successively, until the App on the master device successfully obtains the MAC address of the current device.

Figure 5:
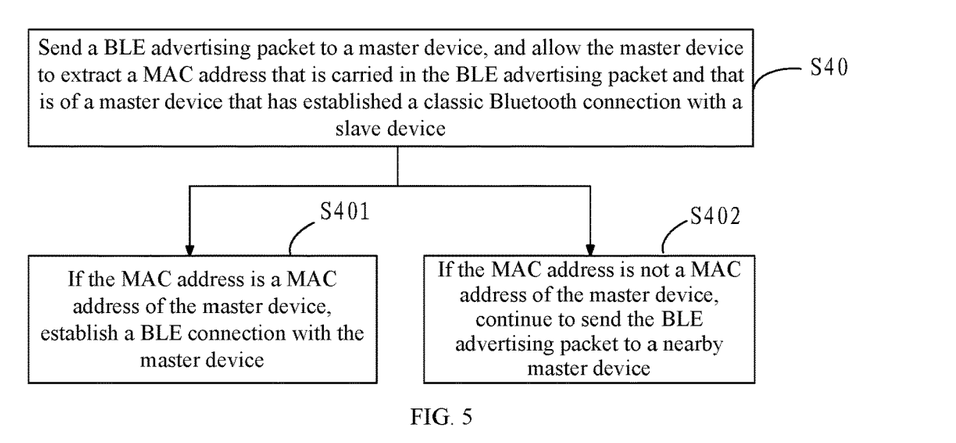
FIG. 5 is a schematic flowchart of a method for identifying a dual-mode wireless device according to another embodiment of the present disclosure.

Fourth Aspect:

Referring to FIG. 5, an embodiment of the present disclosure further provides a method for identifying a dual-mode wireless device. In the method, a dual-mode wireless device (slave device) is used as a first execution body. The method includes the following steps.

S40. Send a BLE advertising packet to a master device, and allow the master device to extract a MAC address that is carried in the BLE advertising packet and that is of a master device that has established a classic Bluetooth connection with a current slave device.

S401. If the MAC address is a MAC address of the master device, establish a BLE connection with the master device.

S402. If the MAC address is not a MAC address of the master device, continue to send the BLE advertising packet to a nearby master device.

It should be noted that, in this embodiment of the present disclosure, the slave device sends a BLE advertising packet to a nearby master device. When receiving the BLE advertising packet, the master device automatically extracts a MAC address that is carried in the BLE advertising packet and that is of a master device that has established a classic Bluetooth connection with the slave device, and then compares the MAC address with a MAC address of the master device. If the two MAC addresses are the same, the master device sends a BLE connection establishment request to the slave device, and then the slave device makes a response to the request, and may immediately establish a BLE connection with the master device. If the two MAC addresses are different from each other, the slave device continues to send an advertising packet to another master device, and waits to make a response to an extraction request from another master device.

Figure 6:
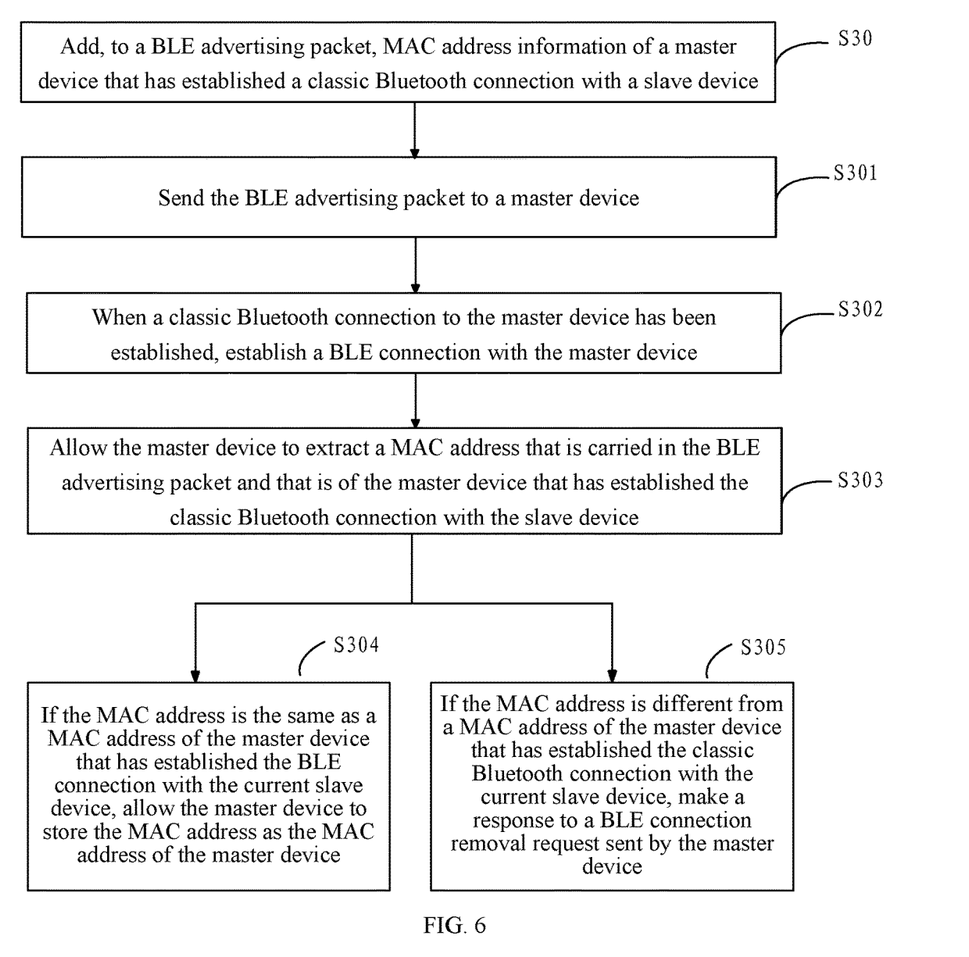
FIG. 6 is a schematic flowchart of a method for obtaining a MAC address of a master device according to another embodiment of the present disclosure.

Fifth Aspect:

Referring to FIG. 6, an embodiment of the present disclosure further provides a method for obtaining a MAC address of a current device. In the method, a dual-mode wireless device (slave device) is used as a first execution body. The method includes the following steps.

S30. Add, to a BLE advertising packet, MAC address information of a master device that has established a classic Bluetooth connection with the current slave device.

S301. Send the BLE advertising packet to a master device.

S302. When a classic Bluetooth connection to the master device has been established, establish a BLE connection with the master device.

S303. Allow the master device to extract a MAC address that is carried in the BLE advertising packet and that is of the master device that has established the classic Bluetooth connection with the current slave device.

S304. If the MAC address is the same as a MAC address of the master device that has established the BLE connection with the current slave device, allow the master device to store the MAC address as the MAC address of the master device.

S305. If the MAC address is different from a MAC address of the master device that has established the BLE connection with the current slave device, make a response to a BLE connection removal request sent by the master device.

It should be noted that, in this embodiment of the present disclosure, the slave device adds, to the BLE advertising packet in advance, the MAC address information of the master device that has established the classic Bluetooth connection with the current slave device. Then, when the slave device has established a classic Bluetooth connection with any master device, the slave device establishes a BLE connection with the current master device. When receiving the BLE advertising packet, the master device automatically extracts the MAC address that is carried in the BLE advertising packet and that is of the master device that has established the classic Bluetooth connection with the slave device, compares the MAC address with a MAC address of the master device, and determines whether the two addresses are the same. If the two addresses are the same, the master device stores the MAC address as the MAC address of the master device; or if the two addresses are different from each other, the master device sends a BLE connection removal request to the slave device.

Figure 7:
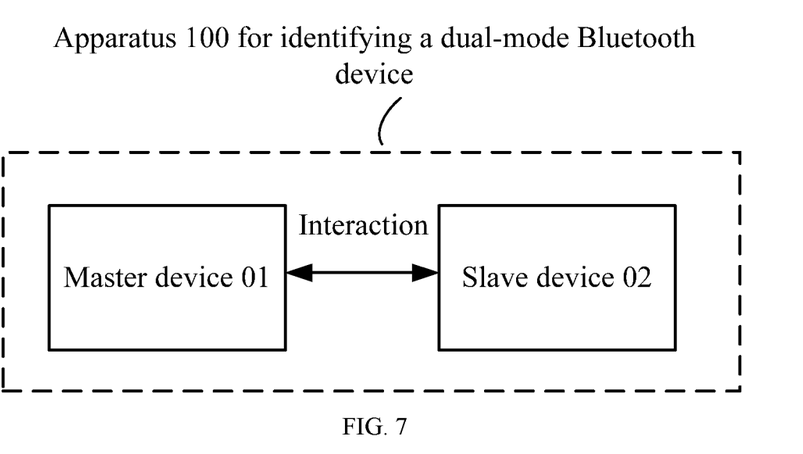
FIG. 7 is a schematic structural diagram of an apparatus for identifying a dual-mode wireless device according to an embodiment of the present disclosure.

Sixth Aspect:

Referring to FIG. 7, an embodiment of the present disclosure further provides an apparatus 100 for identifying a dual-mode wireless device, including a master device 01 and a slave device 02.

The master device 01 is configured to: receive a BLE advertising packet from the slave device; extract a MAC address that is carried in the BLE advertising packet from the slave device and that is of a master device that has established a classic Bluetooth connection with the slave device; and if the MAC address is a MAC address of the current master device, establish a BLE connection with the slave device; or if the MAC address is not a MAC address of the current master device, ignore the BLE advertising packet from the slave device.

The slave device 02 is configured to: send the BLE advertising packet to the master device, and allow the master device to extract the MAC address that is carried in the BLE advertising packet and that is of the master device that has established the classic Bluetooth connection with the current slave device; and if the MAC address is the MAC address of the master device, establish a BLE connection with the master device; or if the MAC address is not the MAC address of the master device, continue to send the BLE advertising packet to a nearby master device.

It should be noted that, when the apparatus implements the method for identifying a dual-mode wireless device, the following content is involved: A smart terminal IOS device (master device) is used as a first execution body, and an APP on the master device has successfully stored a MAC address of the current device. The App on the master device is first enabled to search for nearby slave devices that can be connected, obtains BLE advertising packets from the nearby slave devices, and is successively connected to the slave devices in descending order of signal strength. A search time threshold is set in advance, for example, five seconds. If a search time exceeds this value, and the App has not received an advertising packet from a new slave device, the search is terminated, or a location of the master device may be moved to conduct search again. When receiving an advertising packet from a new slave device, the App first determines whether the slave device has established a classic Bluetooth connection. A determining method is as follow: A MAC address that is recorded in the slave device and that is of a master device that has established a classic Bluetooth connection with the slave device is extracted. If the address is null, it indicates that the slave device has not established a classic Bluetooth connection, and the advertising packet from the slave device can be directly ignored. If the MAC address of the master device recorded in the slave device is extracted, only comparison between the extracted MAC address and the MAC address of the current master device needs to be conducted. When the two addresses are the same, it indicates that the slave device has established a classic Bluetooth connection with the current master device. Then, the current master device may establish a BLE connection with the slave device, and conduct configuration of related performance on the slave device by the App.

In addition, a step of obtaining the MAC address of the master device includes: first enabling the App on the master device, searching for nearby slave devices that can be connected, obtaining BLE advertising packets from the nearby slave devices, and successively connecting to the slave devices in descending order of signal strength. A search time threshold is set in advance, for example, five seconds. If a search time exceeds this value, and the App has not received an advertising packet from a new slave device, the search is terminated, or a location of the master device may be moved to conduct search again. When receiving an advertising packet from a new slave device, the App first determines whether the slave device has established a classic Bluetooth connection. If the slave device has not established a classic Bluetooth connection, the advertising packet from the slave device is ignored. If the slave device has established a classic Bluetooth connection, the master device establishes a BLE connection with the slave device. In this case, the master device extracts, from the slave device, a MAC address of a master device connected to the slave device. If a MAC address that is carried by the current slave device and that is of a master device that has established a classic Bluetooth connection with the slave device is the same as the MAC address of the master device that has established the BLE connection with the current slave device, the master device determines that the MAC address is the MAC address of the current master device, and stores the MAC address in the App on the current master device. If a MAC address that is carried by the current slave device and that is of a master device that has established a classic Bluetooth connection with the slave device is different from the MAC address of the master device that has established the BLE connection with the current slave device, the current master device gets disconnected from the slave device, and returns to the step of obtaining BLE advertising packets from the nearby slave devices and conducts the subsequent operations successively, until the App on the master device successfully obtains the MAC address of the current device.

Seventh Aspect:

An embodiment of the present disclosure further provides a smart terminal IOS device, including: one or more processors; and a memory, coupled to the processor, and configured to store one or more programs; and when the one or more programs are executed by the one or more processors, the one or more processors are enabled to implement the method for identifying a dual-mode wireless device that is described in any one of the foregoing embodiments.

The processor is configured to control overall operations of the smart terminal device to complete all or some of the steps of the foregoing method for identifying a dual-mode wireless device. The memory is configured to store various types of data to support operations on the smart terminal device. The data may include, for example, instructions used for any application or method that is operated on the smart terminal device, and application-related data. The memory may be implemented by any type of volatile or nonvolatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The terminal device may be implemented by one or more application-specific integrated circuits (ASIC), a digital signal processor (DSP), a digital signal processing device (DSPD), a programmable logic device (PLD), a field programmable gate array (FPGA), a controller, a microcontroller, a microprocessor, or other electronic components, is configured to implement the method for identifying a dual-mode wireless device that is described in any one of the foregoing embodiments, and achieves technical effects that are the same as those achieved in the foregoing method.

Eighth Aspect:

An embodiment of the present disclosure further provides a computer-readable storage medium including program instructions. When the program instructions are executed by a processor, the steps of the method for identifying a dual-mode wireless device that is described in any of the foregoing embodiments are implemented. For example, the computer-readable storage medium may be the foregoing memory including program instructions. The program instructions may be executed by a processor of a computer terminal device to complete the method for identifying a dual-mode wireless device that is described in any of the foregoing embodiments.

The descriptions above are preferred implementations of the present disclosure. It should be noted that for a person of ordinary skill in the art, several improvements and modifications can be made without departing from the principle of the present disclosure. These improvements and modifications should also be regarded as falling within the protection scope of the present disclosure.

The invention claimed is:

1. A method for identifying a dual-mode wireless device, comprising:
   receiving a Bluetooth Low Energy (BLE) advertising packet from a slave device;
   extracting a Media Access Control (MAC) address that is carried in the BLE advertising packet from the slave device and that is of a master device that has established a classic Bluetooth connection with the slave device; and
   if the MAC address is a MAC address of a current master device, establishing a BLE connection with the slave device; or
   if the MAC address is not a MAC address of a current master device, ignoring the BLE advertising packet from the slave device;
   wherein after the receiving a BLE advertising packet from a slave device, the method further comprises:
   when the slave device has established a classic Bluetooth connection, establishing a BLE connection with the slave device;
   extracting the MAC address that is carried in the BLE advertising packet from the slave device and that is of the master device that has established the classic Bluetooth connection with the slave device, and determining whether the extracted MAC address is the same as a MAC address of the current master device that has established the BLE connection with the slave device; and
   if the extracted MAC address is the same as the MAC address of the current master device that has established the BLE connection with the slave device, storing the MAC address as the MAC address of the current master device; or if the extracted MAC address is different from the MAC address of the current master device that has established the BLE connection with the slave device, removing the BLE connection from the slave device.

2. The method for identifying a dual-mode wireless device according to claim 1, wherein before the receiving a BLE advertising packet from a slave device, the method further comprises:
if a time for searching for the BLE advertising packet from the slave device is greater than a preset time threshold, terminating the search operation.

3. A smart terminal IOS device, comprising:
one or more processors; and
a memory, coupled to the processor, and configured to store one or more programs; wherein
when the one or more programs are executed by the one or more processors, the one or more processors are enabled to implement the method for identifying a dual-mode wireless device according to claim 2.

4. A computer-readable storage medium, wherein the computer-readable storage medium stores a computer program; and when the computer program is executed by a processor, the method for identifying a dual-mode wireless device according to claim 2 is implemented.

5. A smart terminal IOS device, comprising:
one or more processors; and
a memory, coupled to the processor, and configured to store one or more programs; wherein
when the one or more programs are executed by the one or more processors, the one or more processors are enabled to implement the method for identifying a dual-mode wireless device according to claim 1.

6. A non-transitory computer-readable storage medium, wherein the non-transitory computer-readable storage medium stores a computer program; and when the computer program is executed by a processor, the method for identifying a dual-mode wireless device according to claim 1 is implemented.

7. A method for identifying a dual-mode wireless device, comprising:
sending a Bluetooth Low Energy (BLE) advertising packet to a master device, and allowing the master device to extract a Media Access Control (MAC) address that is carried in the BLE advertising packet and that is of a master device that established a classic Bluetooth connection with a current slave device; and
if the MAC address is a MAC address of the master device, establishing a BLE connection with the master device; or
if the MAC address is not a MAC address of the master device, continuing to send the BLE advertising packet to a nearby master device;
wherein after the sending a BLE advertising packet to a master device, the method further comprises:
when a classic Bluetooth connection to the master device has been established, establishing a BLE connection with the master device;
allowing the master device to extract the MAC address that is carried in the BLE advertising packet and that is of the master device that has established the classic Bluetooth connection with the current slave device; and
if the MAC address is the same as the MAC address of the master device that has established the BLE connection with the current slave device, allowing the master device to store the MAC address as the MAC address of the master device; or if the MAC address is different from the MAC address of the master device that has established the BLE connection with the current slave device, making a response to a BLE connection removal request sent by the master device.

8. The method for identifying a dual-mode wireless device according to claim 7, wherein before the sending a BLE advertising packet to a master device, the method further comprises:
adding, to the BLE advertising packet, MAC address information of the master device that has established the classic Bluetooth connection with the current slave device.

9. A smart terminal IOS device, comprising:
one or more processors; and
a memory, coupled to the processor, and configured to store one or more programs; wherein
when the one or more programs are executed by the one or more processors, the one or more processors are enabled to implement the method for identifying a dual-mode wireless device according to claim 7.

10. A computer-readable storage medium, wherein the computer-readable storage medium stores a computer program; and when the computer program is executed by a processor, the method for identifying a dual-mode wireless device according to claim 7 is implemented.

11. An apparatus (100) for identifying a dual-mode wireless device, comprising a slave device and a master device, wherein the master device (01) is configured to: receive a Bluetooth Low Energy (BLE) advertising packet from the slave device; extract a Media Access Control (MAC) address that is carried in the BLE advertising packet from the slave device and that is of a master device that has established a classic Bluetooth connection with the slave device; and if the MAC address is a MAC address of a current master device, establish a BLE connection with the slave device; or if the MAC address is not a MAC address of a current master device, ignore the BLE advertising packet from the slave device;
wherein after the receiving a BLE advertising packet from a slave device, the master device (01) is further configured to:
when the slave device has established a classic Bluetooth connection, establish a BLE connection with the slave device; extract the MAC address that is carried in the BLE advertising packet from the slave device and that is of the master device that has established the classic Bluetooth connection with the slave device, and determine whether the extracted MAC address is the same as a MAC address of the current master device that has established the BLE connection with the slave device; and if the extracted MAC address is the same as the MAC address of the current master device that has established the BLE connection with the slave device, store the MAC address as the MAC address of the current master device; or if the extracted MAC address is different from the MAC address of the current master device that has established the BLE connection with the slave device, remove the BLE connection from the slave device; and
the slave device (02) is configured to: send the BLE advertising packet to the master device, and allow the master device to extract the MAC address that is carried in the BLE advertising packet and that is of the master device that has established the classic Bluetooth connection with a current slave device; and if the MAC address is the MAC address of the master device, establish a BLE connection with the master device; or if the MAC address is not the MAC address of the master device, continue to send the BLE advertising packet to a nearby master device;

wherein after the sending a BLE advertising packet to a master device, the slave device (02) is further configured to:

when a classic Bluetooth connection to the master device has been established, establish a BLE connection with the master device; allow the master device to extract the MAC address that is carried in the BLE advertising packet and that is of the master device that has established the classic Bluetooth connection with the current slave device; and if the MAC address is the same as the MAC address of the master device that has established the BLE connection with the current slave device, allow the master device to store the MAC address as the MAC address of the master device; or if the MAC address is different from the MAC address of the master device that has established the BLE connection with the current slave device, make a response to a BLE connection removal request sent by the master device.

12. A smart terminal IOS device, comprising:
one or more processors; and
a memory, coupled to the processor, and configured to store one or more programs; wherein
when the one or more programs are executed by the one or more processors, the one or more processors are enabled to implement the method for identifying a dual-mode wireless device according to claim 7.

13. A computer-readable storage medium, wherein the computer-readable storage medium stores a computer program; and when the computer program is executed by a processor, the method for identifying a dual-mode wireless device according to claim 11 is implemented.

* * * * *